United States Patent Office

Re. 27,322

Reissued Mar. 28, 1972

27,322

ISOLATION OF THREONINE AND ALLOTHREONINE FROM THEIR MIXTURE

Kiichi Fujii, Kyoto-shi, Mutsuo Oda, Tokyo-to, Junichiro Arita, Moriguchi-shi, Mikio Takeda, Saitama-ken, and Kango Sakai, Toyonaka, Japan, assignors to Tanable Seiyaku Co., Ltd., Osaka, Japan No Drawing. Original No. 3,068,281, dated Dec. 11, 1962, Ser. No. 814,374, May 20, 1959, which is a continuation of Ser. No. 293,573, July 2, 1962. Application for reissue Apr. 4, 1968, Ser. No. 757,805

Claims priority, application Japan Oct. 1, 1958

(Filed under Rule 47(a) and 35 U.S.C. 116)

Int. Cl. C07c *101/30*

U.S. Cl. 260—534 M 17 Claims

Matter enclosed in heavy brackets [ ] appears in the original patent but forms no part of this reissue specification; matter printed in italics indicates the additions made by reissue.

*ABSTRACT OF THE DISCLOSURE*

*In a process of purifying crude threonine contaminated with allothreonine, the improvement comprising reacting a copper chelate of the crude material with a lower aliphatic aldehyde to form the aldehyde-copper chelates of both the threonine and allothreonine, separating the chelates by differential crystallization and decomposing they separated threonine chelate to recover purified threonine.*

*This application is a continuation of Ser. No. 293,573, filed July 2, 1962, now abandoned; which in turn is an application for reissue of Pat. No. 3,068,281, granted Dec. 11, 1962.*

This invention relates to a process for isolation of threonine and allothreonine from their mixture. More particularly it relates to a process of purification of threonine containing allothreonine as an impurity.

Threonine is the threo-type stereoisomeric racemate of α-amino-β-hydroxybutyric acid, the other allo-type racemate being known as allothreonine. Methods now available for the preparation of threonine generally result in formation of a mixture of the two stereoisomeric racemates. Since allothreonine is of no value, separation of DL-threonine must be carried out. This separation is difficult and costly, especially in the case of crude threonine containing a large amount of the allothreonine impurity. In accordance with this invention, we have found that when a mixture of copper chlelate of crude threonine containing the allothreonine impurity is reacted with a lower aliphatic aldehyde, bis(aldehyde)bis(threoninato) copper of high threo-type content is separated from the reaction mixture in which the allothreonine impurity is dissolved. Copper chelate of crude threonine containing the allothreonine impurity may be prepared by the reaction of crude threonine with basic copper carbonate or with a water-soluble copper salt, such as the sulfate or the chloride, in an alkaline solution.

In a preferred mode of operating the invention, a solution of the mixture of copper chelate in water is reacted with a lower aliphatic aldehyde such as acetaldehyde, propionaldehyde and butylaldehyde, to form bis(aldehyde)bis(threoninato) copper and its allo-type isomer.

The resulting bis(aldehyde)bis(threoninato) copper represented by the following formula:

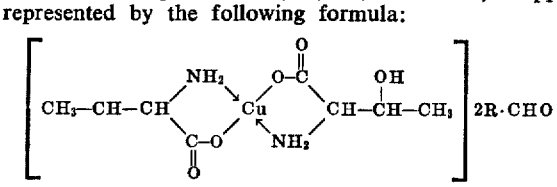

wherein R stands for a lower alkyl group having 1 to 5 carbon atoms, is relatively insoluble in water, while the other corresponding allothreonine compound is soluble in water.

When the reaction mixture is allowed to stand for crystallization and is filtered, purified bis(aldehyde)bis(threoninato) copper is recovered. When the content of allothreonine impurity in the starting mixture is too high to make its isolation from the mixture by a single crystallization possible, it is preferable to recrystallize the resulting compound from dilute methanol.

Free purified threonine may be prepared by removing copper and aldehyde from the purified bis(aldehyde)bis(threoninato) copper. This step is conveniently carried out by bubbling hydrogen sulfide gas into an aqueous suspension of said compound. Then the treated mixture is filtered to remove copper sulfide, and the filtrate is concentrated. When a large amount of absolute methanol is added to this concentrate, purified threonine crystallizes.

This procedure can be conducted either by employing a cation exchange resin alone or in conjunction with said hydrogen sulfide. Thus free threonine is prepared by passing a solution of the purified bis(aldehyde)bis(threoninato) copper in aqueous ammonia through a column of cation exchange resin, such as Amberlite IR–120, which is preliminarily treated with aqueous ammonia, concentrating the passed solution and adding absolute methanol to the solution thus concentrated.

Example 1

10 grams of crude threonine containing 24% of allothreonine are dissolved in 150 cc. of water and 5 grams of basic copper carbonate are added to the solution under stirring. The reaction mixture, which is colored blue, is filtered to remove insoluble matter. 3.8 grams of acetaldehyde are added to the filtrate under stirring and then the mixture is allowed to stand. 11 grams of bis(acetaldehyde)bis(threoninato) copper which contain almost no allothreonine compound are recovered by filtration. The yield of the product thus obtained is 88%, when calculated on the basis of the threonine content in the starting material.

Analysis.—Calculated for $C_{12}H_{24}O_8N_2Cu$: C, 37.13; H, 6.24; N, 7.23; Cu, 16.39. Found: C, 36.87; H, 6.06; N, 7.48; Cu, 16.39.

This product is suspended in 60 cc. of water containing a small amount of acetic acid. In this suspension, hydrogen sulfide gas is bubbled until the blue color of the suspension disappears, forming insoluble copper sulfide. The resulting solution is filtered to remove the precipitate and the filtrate is concentrated to ⅕ of the original volume. To the concentrate, 50 cc. of methanol is added and then crystallized DL-threonine is collected. 5.7 grams of DL-threonine which decompose at 237° C. are obtained after recrystallization from diluted methanol. The product shows 100% DL-threonine upon bio-assay and no allothreonine spot appears on paper chromatography.

Example 2

10 grams of crude theronine containing 24% of allothreonine are dissolved in 400 cc. of water and 5 grams of basic copper carbonate are added to the solution under stirring. The reaction mixture, which is colored blue, is filtered to remove insoluble matter. 6.5 grams of butyraldehyde are added to the filtrate under stirring. 12.9 grams of bis(butyraldehyde)bis(threoninato) copper which contain almost no allothreonine compound are recovered by filtration. The yield of the product thus obtained is 91%, when calculated on the basis of the threonine content in the starting material.

Analysis.—Calculated for $C_{14}H_{32}O_8N_2Cu$: C, 43.26; H, 7.27; N, 6.31; Cu, 14.32. Found: C, 43.20; H, 7.42; N, 6.43; Cu, 14.32.

Removal of copper and butyraldehyde from the product is accomplished in the same manner as described in Example 1. The obtained DL-threonine which decomposes at 237° C. weighted 5.7 grams, and is shown by bioassay to be 100% DL-threonine. No allothreonine spot appears on paper chromatography of the product.

What is claimed is:

1. A process for recovering threonine from admixture thereof with its allotype isomer which comprises introducing into an aqueous medium a mixture of the copper chelate of said threonine with a lower alkyl aldehyde, whereby a reaction takes place forming insoluble bis-(aldehyde)bis(threonato) copper chelate, filtering the reaction mass to recover said insoluble bis(aldehyde)bis-(threonato) copper chelate, and separating threonine from said chelate.

2. A process according to claim 1 characterized in that the copper chelate is treated with a compound which forms an insoluble copper compound and forming soluble purified threonine, and separating said insoluble compound therefrom.

3. A process according to claim 1 characterized in that the copper chelate is treated with hydrogen sulfide to form an insoluble copper compound and forming soluble purified threonine, and separating said insoluble compound therefrom.

4. A process according to claim 3 characterized in that the addition of hydrogen sulfide is continued until the blue color of the mass disappears.

5. A process according to claim 2 characterized in that said chelate is suspended in aqueous medium for treatment with said compound.

6. A process according to claim 2 characterized in that the solution of threonine is treated with methanol to precipitate the threonine.

7. A process according to claim 2 characterized in that the solution of threonine is concentrated and then is treated with methanol to precipitate the threonine.

8. A process according to claim 1 characterized in that the copper chelate is treated with a cation exchange resin to form an insoluble copper compound and forming soluble purified threonine, and separating said insoluble compound therefrom.

9. A process according to claim 3 characterized in that the threonine solution so formed is passed through a cation exchange resin.

10. A process according to claim 4 characterized in that the copper chelate is dissolved in aqueous ammonia and the solution is passed through said cation exchange resin.

*11. A process for purifying crude threonine contaminated with allothreonine which comprises:*

*(a) reacting, in an aqueous medium, said crude threonine with basic copper carbonate, or in an alkaline aqueous medium a water soluble copper salt to form a copper chelate of said crude threonine;*

*(b) reacting said chelate with a lower aldehyde with an alkyl group having 1 to 5 carbon atoms to form the aldehyde-copper chelates of threonine and allothreonine;*

*(c) separating said aldehyde-copper chelates by differential crystallization; and*

*(d) decomposing the separated threonine chelate to recover purified threonine.*

*12. A process according to claim 11 wherein said aldehyde is selected from the group consisting of acetalhyde, propionaldehyde, and butylaldehyde.*

*13. A process of purifying crude threonine contaminated with allothreonine comprising:*

*(a) reacting a copper chelate of said crude threonine with a lower aldehyde having an alkyl group, said group having 1 to 5 carbon atoms, to form the aldehyde-copper chelates of threonine and allothreonine;*

*(b) separating said chelates by differential crystallization; and*

*(c) decomposing the separated threonine chelate to recover purified threonine.*

*14. A process for purifying crude threnoine contaminated with allothreonine comprising:*

*(a) reacting said crude threonine with a water soluble copper salt in an alkaline aqueous medium to form crude threonine copper chelate;*

*(b) reacting said crude chelate with a lower aldehyde having an alkyl group of 1 to 5 carbon atoms to form the aldehyde-copper chelates of threonine and allothreonine;*

*(c) separating said chelates by differential crystallization; and*

*(d) decomposing the separated threonine chelate to recover purified threonine.*

*15. A process according to claim 11 in which basic copper carbonate is present.*

*16. A process according to claim 11 wherein said threonine is reacted with copper carbonate, copper sulfate or copper chloride.*

*17. A process as set forth in claim 12, wherein said aldehyde is acetaldehyde.*

References Cited

The following references, cited by the Examiner, are of record in the patented file of this patent or the original patent.

UNITED STATES PATENTS 2,831,763 4/1958 Nashner ---------- 75—117

OTHER REFERENCES

Journal of Ind. Chem. Soc., vol. 32 pp. 581–588; Mukherjie (abstracted in Chem. Abs., vol. 50, p. 11,973).

Finar: "Organic Chemistry," vol. 1, p. 390 (1959).

Bailar: "Chemistry of the Coordination Compounds," 37 (1956).

Martell et al.: "Chemistry of the Metal Chelate Compounds," p. 26 (1952).

LORRAINE A. WEINBERGER, Primary Examiner

J. L. DAVISON, Assistant Examiner

U.S. Cl. X.R.

260—438.1